United States Patent [19]
Guillotel

[11] Patent Number: 5,296,927
[45] Date of Patent: Mar. 22, 1994

[54] METHOD OF CODING WITH ADJUSTABLE PARAMETERS OF A FIELD OF MOVEMENT IN A SEQUENCE OF ANIMATED IMAGES

[75] Inventor: Philippe Guillotel, Rennes, France
[73] Assignee: Thomson-CSF, Puteaux, France
[21] Appl. No.: 834,263
[22] PCT Filed: Jun. 25, 1991
[86] PCT No.: PCT/FR91/00505
§ 371 Date: Feb. 19, 1992
§ 102(e) Date: Feb. 19, 1992
[87] PCT Pub. No.: WO92/00651
PCT Pub. Date: Jan. 9, 1992

[30] Foreign Application Priority Data
Jun. 29, 1990 [FR] France ................. 90 08299

[51] Int. Cl.$^5$ .............................................. H04N 7/137
[52] U.S. Cl. ...................................... 348/415; 348/699
[58] Field of Search ........................ 358/133, 136, 105; H04N 7/137

[56] References Cited
U.S. PATENT DOCUMENTS
4,922,341 5/1990 Strobach ............................. 358/136
4,980,764 12/1990 Henot ................................. 358/133

FOREIGN PATENT DOCUMENTS
0342756 11/1989 European Pat. Off. ........ H04N 7/00
0349454 1/1990 European Pat. Off. ........ H04N 7/00

OTHER PUBLICATIONS
Frequenz, vol. 43, Nos. 3,4, Mar.-Apr. 1989, M. Gilge et al.: "Codierung von farbigen Bewegtbildszenen mit 64 kbits/s-en neuer Ansatz aur Verwirklichung eines Bildtelefons im ISDN (Teil I+Teil II)", pp. 86-96, 98-108.
2DN International Workshop on Signal Processing of HDTV, L'Aquila, Feb. 29-Mar. 2, 1988, J. P. Henot: "Coding of motion information for high definition television", pp. 355-363.
4th International Colloquium on Advanced Television Systems, Ottawa, Jun. 25-29, 1990, C. M. X. Fernando et al.: "Display processing for HD-MAC", pp. 3B.6.1-3B.6.15.

*Primary Examiner*—Howard W. Britton
*Attorney, Agent, or Firm*—Oblon, Spivak, McClelland, Maier & Neustadt

[57] ABSTRACT

A method for decomposing each field of movement of an image according to a coding tree and for identifying by a menu each movement vector present in the image by accompanying each vector by its codeword.

6 Claims, 2 Drawing Sheets

METHOD OF CODING WITH ADJUSTABLE PARAMETERS OF A FIELD OF MOVEMENT IN A SEQUENCE OF ANIMATED IMAGES

The present invention relates to a method of coding with adjustable parameters of a field of movement in a sequence of animated images.

The analysis of the movement in a sequence of animated images, especially in television, is an operation which is of fundamental importance in the chain of operations carried out in order to process the images.

The known hierarchical methods of estimation such as described, for example, in French Patent Application Number 89 11328 filed in the name of the Applicant appear the most effective up to the present, and the best adapted to the fact that the field of movement of an image can be considered as the assembly of areas of images with constant movement. These methods also exhibit the advantage that they make it possible to obtain a constant movement on homogeneous areas of the image or to find the movement corresponding to the large areas in movement (panoramic . . . ) but also to have good precision especially at the borders of the areas in movement and in the areas with varied movement.

However the problem which is posed is to be able to code the field of vectors obtained in such a way as to obtain as small a data rate as possible. Up until now the present the problem has been resolved by differentiating on the one hand the coding of a field of movement as part of the coding of the image, and on the other hand the specific coding of a field of movement for precise applications especially in television.

Examples of coding of field of movement as part of the image coding have already been the subject of the following publications entitled:

"Variable block-size image coding" J. Jacques VAISEY and Allen GERSHO IEEE—1987

"Video codec for audiovisual services AT p×64 Kbits" Draft revision of recommendation H.261—30 March 1990 and "Motion vector coding with conditional transmission" WOO YOUNG CHOI and RAE-HONG PARK—Signal processing vol. 18 no. 3—Nov. 89 pages 259-267

Examples of coding of fields of movement for more specific applications like television can be found in the articles entitled:

"HDMAC coding for MAC compatible Broadcasting of HDTV signals" F. W. P. VREESWIJK and Dr. M. R. HAGHIRI —3rd International workshop or HDTV—30th August 1989—Turin "Coding of motion information on signal processing of HDTV" J. P. HENOT—2nd International workshop on signal processing of HDTV—29 february-2 march 1988 —L'Aquila.

In the first case, coding of the movement vectors represented only approximately 10% of the total digital data rate. In these conditions, there is no necessity, due to this fact, for specific development. The methods utilized are then the same as for the image coding and consist in carrying out coding with variable length adapted to differential methods with respect to the points adjacent to the current point or with respect to the mean of the vicinity, or even adapted to methods by entropy, this latter necessitating the calculation of a histogram. Certain solutions use on the other hand, a decomposition by a coding tree in order to group together the homogeneous areas of the image.

In these different applications the binary cost of the field of movement is not the principal constraint. However the constraints encountered in high-definition television have made it necessary to develop methods of coding which are specific for the movement data. The article by Mr. J. P. Henot quoted above uses coding for using the special correlation which exists in an image, the article by Messrs. VREESWIJK and HAGHIRI describes a use of a relative addressing of the vectors of an image on the preceding one in order to use time correlation.

Nevertheless these methods do not make it possible to regulate the transmission data rate, or sometimes even to obtain a data rate less than 1 Mbit/s with an image quality which remains acceptable.

The aim of the invention is to overcome the above-mentioned drawbacks.

To this end, the subject of the invention is a method of coding with adjustable parameters of a field of movement in a sequence of animated images characterized in that it consists in decomposing each field of movement of the image according to a coding tree and in identifying by a menu each movement vector present in the image by accompanying each vector by its codeword. This decomposition is carried out by macroblock, that is to say in one part of the image or in the entire image (1 single macroblock).

Due to the fact that it employs a menu of vectors the method according to the invention has the advantage that it offers the possibility of regulating the data rate, of carrying out coding by a spatial and temporal coding tree by taking into account the movement over 2 consecutive images. It also offers the possibility of having codewords of variable length as a function of the number of vectors per macroblock, of limiting the information to be coded by suppressing the least-prevalent vectors instead of spatially analyzing the data, it makes it possible to have a maximum boundary for the data rate, and finally it permits coding of the tree as a specific "vector" or coding of the tree separately.

The method according to the invention also has the advantage of being able to be used on any device for processing of images which necessitates a reduction of the information data rate. It can be applied especially to the coding of fields of movement in high-definition television, to the coding of an image as well as to the digital coding of the auxiliary television signals of the television system known under the designation HDMAC. It permits the user to choose according to his constraints the parameters of the coding which will give him the best data rate—quality compromise, and does this in a dynamic way (that is to say differently according to the images and as a function of the data rate or of the quality obtained) or static (that is to say once and for all, at the outset).

BRIEF DESCRIPTION OF THE DRAWINGS

Other characteristics and advantages of the invention will appear below with the aid of the description which follows given with reference to the attached drawings wherein.

DETAILED DESCRIPTION OF THE PREFERRED EMBODIMENTS

In order to be able to code a field of movement vectors in such a way as to obtain for transmission of the images the smallest possible data rate of codewords, the idea of the invention is to group together these data in order to obtain a field of vectors with blocks which are as large as possible corresponding to the homogeneous areas of the image. That amounts to determining a coding tree defined by the homogeneous areas of the image and to linking this coding to the coding of a field of movement while taking account of variable parameters in order to obtain a good resolution-data rate compromise.

Figures 1A, 1B:
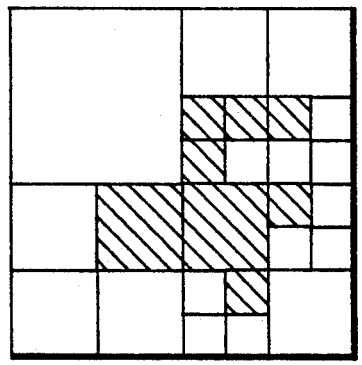
FIGS. 1A, 1B, 1C illustrates a method of decomposition of images into blocks with which is associated a decomposition tree for the coding of the blocks.
Figure 1C:
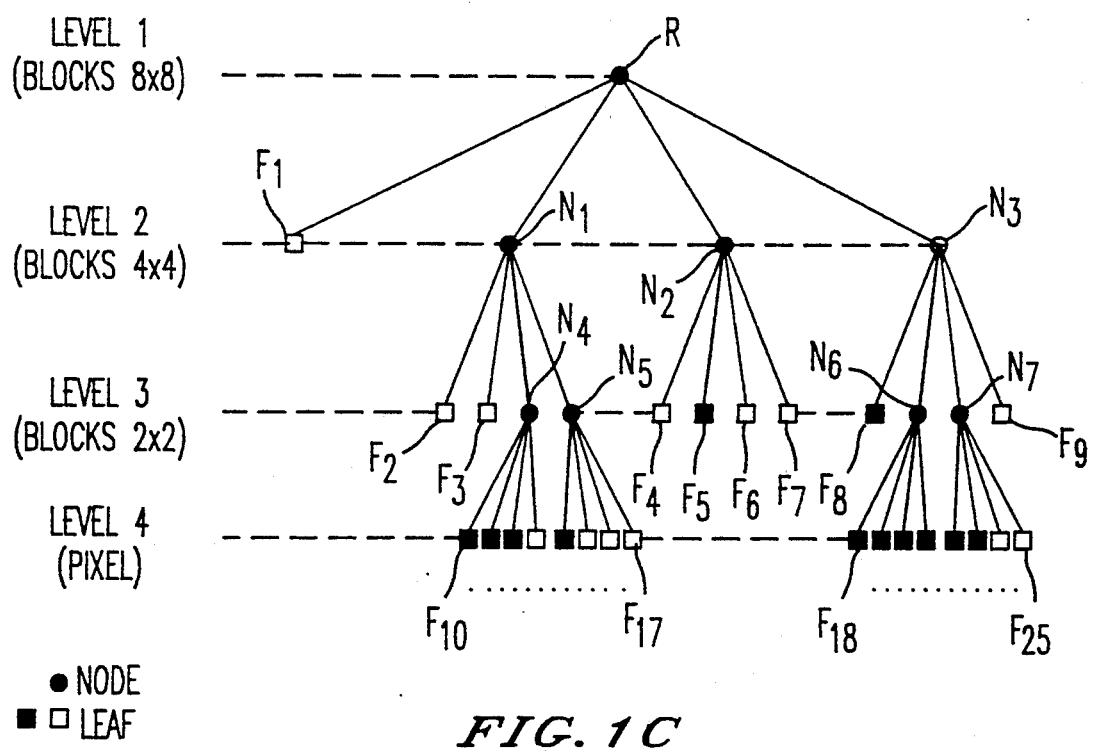

The decomposition into a coding tree consists, as FIGS. 1A, 1B and 1C show, in dividing an image into homogeneous blocks of size $n \times n$ which are as large as possible, then in associating with the division obtained a tree (FIG. 1C) whose root R represents the image, the nodes ($N_1$ to $N_7$), the non-homogeneous blocks of size $2n \times 2n$ which are decomposed into four sub-blocks of size $n \times n$ and the leaves $F_1$ to $F_{25}$ of the non-homogeneous blocks. Thus is obtained, in the case of the example represented in FIGS. 1A, 1B and 1C, 4 levels of codes, a first level (level 1) corresponds to a block of size $8 \times 8$ pixels forming the root, a second level (level 2) causes four blocks of size $4 \times 4$ pixels to appear, a third level (level 3) is composed of 16 blocks of $2 \times 2$ pixels and the fourth level (level 4) is composed of the remaining pixels.

Thus instead of having one data item for each elementary block or pixel, the method according to the invention makes it possible to obtain a division into areas where the information to be coded is identical (represented by the leaves).

In the case of the coding of a field of movement the information to be coded is the value of the movement vector obtained to which is added a coding of the nodes which are necessary for the construction of the tree on decoding in the form of a specific "vector".

In the hypothesis where the coding is limited to vectors of nominal amplitude $\pm V$ in the horizontal and vertical directions of the image, the number of possible combinations is then $(2V+1)^2$ and the number of bits necessary for the coding is equal to $$\log_2[(2V+1)^2]$$

By way of example, for a vector of amplitude $\pm 6$ pixels ($V=6$), the number of combinations is $13 \times 13 = 169 + 1(\text{node}) = 170$ and the number of bits per codeword is then equal to 8.

However, as in an image all the possible vectors are not necessarily present, one of the characteristics of the invention is to produce a menu of vectors containing all the vectors present in the image. In these conditions the information to be coded is no longer the value of the vector, but a relative addressing in the menu.

Thus again taking the preceding example and supposing that only 45 different vectors are present out of the 169 possible, the number of combinations is reduced to $45+1=46$ and the number of bits per codeword is reduced to 6.

Figure 2:
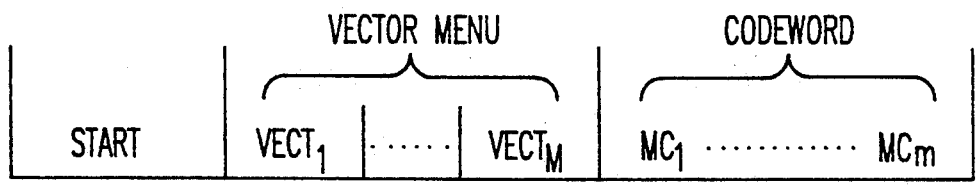
FIG. 2 illustrates a composition of the fields of movement to be transmitted after application of the decomposition into a coding tree of FIGS. 1A, 1B and 1C.

But this obliges the menu vectors to be transmitted accompanied by their codewords as the configuration of FIG. 2 shows. In this Figure the Deb field represents a start word containing the vector number (n) and the codeword number (number of leaf and of node = m). The fields $Vect_i$ represent the vectors present in the image and the fields $MC_i$ represent the codewords representing either a node or the number of a vector of the menu.

However although the preceding decomposition of the movement vectors into a coding tree takes advantage of the strong spatial bi-dimensional correlation existing between the movement vectors, it does not take account of the time correlation which exists from one image to the other and which can definitely permit a reduction in the data rate. This problem is resolved by the invention by a decomposition into a coding tree which is no longer done on one image but on two successive images and which leads to using only a single tree for two images. A homogeneous block must in these conditions be homogeneous spatially over two consecutive images with the same vector. The number of vectors of the menu is then equal to the number of different vectors of the current image and of the preceding or following image and the number of combinations is equal to the number of different vectors of the current image multiplied by the number of different vectors of the preceding or following images.

Figure 3:
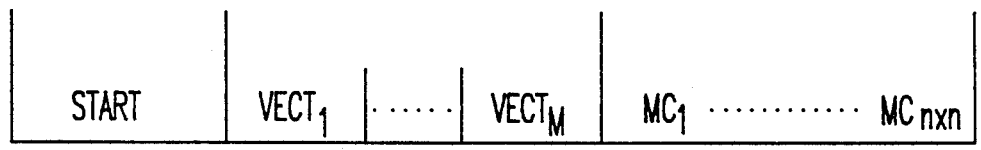
FIG. 3 shows a composition of the words of codes to be transmitted when the number of leaves added to the number of nodes is greater than the size of the image to be transmitted.
Figure 4:
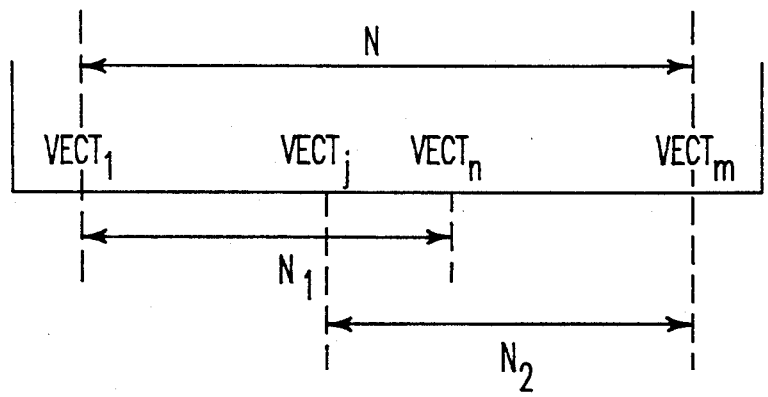
FIG. 4 shows a mode of assembly of the menu of vectors to be transmitted by carrying out a decomposition into a coding tree over, two successive images.

However, when for an image of size $n \times n$ the number of leaves added to the number of nodes becomes greater than the product $n \times n$, the coding by means of the decomposition into a tree is no longer of interest and in this case the codewords are transmitted directly according to the organization of FIG. 3, where the words of codes $MC_i$ relate only to the index of the corresponding vector in the menu, no node being taken into consideration and there are as many $MC_i$ as pixels in the image. Naturally this figure case corresponds to a maximum data rate.

In the case where the decomposition is carried out over 2 consecutive images the DEB field contains the number $N_1$ of vectors of the current image, the number $N_2$ of vectors of the preceding (or following) image, the number of different vectors (N) in the current image and in the preceding (or following) image and the number of words of codes MC. The menu of the vectors $VECT_1 \ldots VECT_n$ is then transmitted in the way represented in FIG. 4 while taking account of the similar vectors in the vectors $N_1$ and $N_2$ which it is not useful to transmit twice in the menu.

Since in the applications necessitating coding, the maximum data rate admissible is in general fixed, the method according to the invention has the advantage that it makes possible coding of no matter what field of movement whatever the fixed data rate. However as a degradation of quality exists when the fixed data rates are lower and lower, a good compromise between data rate and quality can be obtained by adapting the size of the blocks. For example, instead of taking the decomposition of the coding tree down to the level of the pixel it is always possible to stop at a size of blocks of 2×2 or 4×4 . . . etc., with a vector associated with each elementary size, the data rate in these conditions becomes smaller. It is also possible to adjust the amplitude of the vectors. In this case the data rate can be very substantially reduced and only the menu of the vectors is to be modified due to the fact of the relative addressing. Another method of reduction of the data rate can also consist in limiting the number of vectors per image and consequently the number of bits per codeword but, however, this method amounts to banning certain vectors in the image. However by dividing the image into macroblocks of size for example equal to ¼ of an image and by calculating a tree on each of these blocks in such a way as to obtain several menus per image, the number of vectors can be reduced in each macroblock while conserving for the whole image the possibility of having all the possible vectors.

In order to avoid significant degradation of the field of movement it is important to produce a compromise between the size of the macroblocks and the maximum number of vectors authorized inside these blocks. These parameters are determinable on the initialization of the method and can naturally also be modified in the course of transmission in order to provide a transmission with a constant data rate. In this latter case the coding of the field of movement can take place unrestrictedly at first and can afterwards be modified only when the optimum data rate is exceeded by action on certain parameters in order to remain within the fixed maximum data rate.

The method according to the invention is advantageously applicable to the coding of the television images of the HDMAC standard. In this case, in fact, the coding takes place on the basis of 16×16 pixel blocks every 40 ms by each time considering two interlaced frames. In this type of coding, each block is defined according to three modes, an 80 ms mode for the fixed blocks for which movement is nil, a 40 ms mode for the blocks which are in movement with an amplitude less than 6 pixels and a 20 ms mode for the blocks which are in movement at greater than ±6 pixels. Only the 40 ms mode which utilizes movement vectors is compensated in movement and on 80 ms corresponding to the duration of two interlaced images only the following combinations are authorized (80-80, 40-40, 40-20, 20-40, 20-20). The method of coding according to the invention takes into account this reduction in the number of possible combinations, the 40 ms mode using only compensation for movement in one frame out of two. The information to be coded by 16×16 blocks is that of the mode obtained with the vector possibly associated with a maximum data rate of 1 Mbit/s.

The parameters for definition of the coding tree are then:
  size of the elementary blocks: 16×16 pixels
  amplitude of the vectors: ±6 pixels
  chosen macroblock of size: 128×128 pixels
  size of the HD images: 1440×1152 pixels
  maximum data rate authorised: 1 Mbit/s
  information coded every 80 ms by 16×16 block.

The number of combinations is defined for each combination of the mode as follows:
  80-80→1 combination
  40-40→$N_1 \times N_2$ combinations
  40-20→$N_1$ combinations
  20-40→$N_2$ combinations
  20-20→1 combination
where
  $N_1$ designates the number of vectors in the first image per block of 128×128 pixels,
  and $N_2$ designates the number of vectors in the first image per block of 128×128 pixels.
For $N_{1max} = N_{2max} = 64$
the number of maximum possibilities (including a node) is equal to
$3 + N_1 + N_2 + N_1.N_2 = 4227$ and can be coded by codewords of 13 bits.

As in the HDMAC standard only 1408 points/line and 1152 lines are transmitted the number of macroblocks of size 128×128 to be considered is equal to 99.

Returning to FIGS. 2, 3 and 4 the start word DEB of each macroblock in these conditions for each successive image 1 and 2 contains:
  $N_1$ vectors of the image 1 ($N_1$ lying between 0 and 64)
  $N_2$ vectors of the image 2 ($N_2$ lying between 0 and 64)
  N vectors different in the images 1 and 2
  (N being equal to the maximum of the sum of the $N_1 + N_2$ vectors). and
  n words of codes (n lying between 1 and 64).
This is a total maximum of $N_1 \times N_2 \times N \times n = 34881600$ possible combinations representable by a codeword DEB of 26 bits. (These data being necessary for the decoding in order to recover the codewords from among the binary flow).

The vectors amplitude ±6 pixels necessitate 8 bits in order to be coded. The maximum theoretical binary data rate is equal in these conditions to the product of the number of macroblocks transmitted (99) multiplied by the sum of the bits composing the DEB word (26), the bits comprising the vector menu (2×64×8), and the bits of codewords (64×13) the result of the product obtained being multiplied again by the frequency 12.5 Hz corresponding to a transmission of this packet of bits every 80 ms.

In the HDMAC application under consideration the data rate which results from this is 2328975 bits/s. In order to fit into the data rate of 1 Mbits/s the number of vectors has to be limited to 13 per macroblock (out of the 64 possible). The data rate obtained is then $$99 \times [19 + (13 \times 2 \times 8) + (64 \times 8)] \times 12.5 = 914513 \text{ bits/s}$$

When no longer considering vectors of amplitude ±6 pixels but vectors of ±14 in the horizontal direction of the image and of ±8 in the vertical direction, the maximum data rate becomes $$99 \times [19 + (13 \times 2 \times 9) + (64 \times 8)] \times 12.5 = 946687.5 \text{ bits/s.}$$

Naturally instead of choosing as before to limit the number of vectors to 13 over all the images it is again possible to operate this limitation in a dynamic fashion, by transmitting, for example, all the possible vectors if the data rate is less than 1 M bit/s and by on the other hand limiting the number of vectors until the data rate is less than 1 M bit/s. The limitation to 13 in the vectors can be obtained by taking only the 13 most prevalent per macroblock and by assigning the closest vector among the 13 vectors suppressed.

On the other hand the normal size of the blocks which is 16×16 in HDMAC coding can possibly be reduced as the method of the invention can always be applied independently of the chosen largest or smallest size of the blocks.

Figure 5:
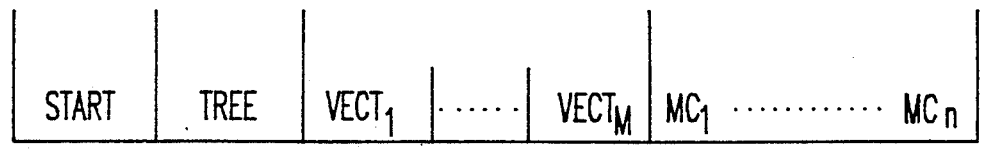
FIG. 5 shows a composition of the fields of movement to be transmitted after application of the decomposition into a coding tree of FIGS. 1A, 1B and 1C for the case where the tree is coded separately by the vectors.

In order to reduce the data rate, it is preferable no longer to code a node as a specific "vector" (in order to reconstruct the tree on decoding) but to transmit a "TREE" field such as represented in FIG. 5, which represents the code tree. Each bit of this field indicates a node or a leaf, the first bit indicates the state of the root (block of size n×n, leaf or node), the second, the third, the fourth and the fifth the state of the 4 sub-blocks of size n/2, xn/2, etc . . . up to the penultimate level possible. Thus for FIGS. 1A, 1B, 1C, the word "TREE" would be:

1 0111 0000 0011 0000 0110 with
1→R
0111→$F_1N_1N_2N_3$
0000→sub-blocks of $F_1$
0011→$F_1F_3N_4N_5$
0000→$F_4F_5F_6F_7$
0110→$F_8N_6N_7F_9$
and
1=node
0=leaf.

The codewords ($MC_i$) now represent only one of the mode/vector combinations.

Thus for the HDMAC application, there are four levels (128, 64, 72, 16) the word "TREE" is thus of 21 bits.

The gain in data rate is obtained due to the fact that previously a node was coded with as many bits as a vector (i.e. 8 bits maximum). Supposing that there are only 5 nodes (out of the 21 possible), 8×5=40 bits would be necessary for the tree. With the present method only 21 are necessary. At the maximum this method can give a gain of:

[21(number of nodes)×8]−[21]=147 bits per macroblock with 8 bits per codeword ie. 147×99×12.5=181912.5 bits/s.

Moreover with the coding separated from the tree, the case represented by FIG. 3 can be used for the case where the tree is completely decomposed. Thus is guaranteed the same maximum data rate as before (the word "TREE" is not transmitted).

I claim:

1. A method of coding with adjustable parameters of a field of movement in a sequence of animated images comprising the steps of:
    dividing an image into a plurality of macroblocks of given dimensions;
    calculating a coding tree for each of said macroblocks in order to obtain a plurality of vector menus corresponding to said image;
    decomposing each field of movement of said image according to said coding tree; and
    identifying, using said menus, each movement vector present in said image by accompanying each vector by its address in said menus.

2. The method according to claim 1 wherein the tree can be described either as a specific vector, or transmitted separately.

3. The method according to claim 1, wherein the size of the macroblocks is adjustable.

4. The method according to claim 3 wherein said method further comprises the step of adjusting the length of the movement vectors.

5. The method according to claim 4, wherein the decomposition into said coding tree takes place on two successive images.

6. The method according to claim 5 further comprising the step of limiting the number of vectors by suppressing the least-prevalent vectors.

* * * * *